Jan. 17, 1967  D. O. FRANCIS  3,298,726
KNOTTER
Filed Feb. 25, 1965  6 Sheets-Sheet 1

INVENTOR.
David O. Francis
BY
Attorneys

Jan. 17, 1967  D. O. FRANCIS  3,298,726
KNOTTER

Filed Feb. 25, 1965  6 Sheets-Sheet 3

INVENTOR.
David O. Francis
BY *Albert P. Wanes*
*Burnett W. Norton*
Attorneys

Jan. 17, 1967 D. O. FRANCIS 3,298,726
KNOTTER
Filed Feb. 25, 1965 6 Sheets-Sheet 4

INVENTOR.
David O. Francis
BY *Albert P. Davis*
*Burnett W. Horton*
Attorneys

Jan. 17, 1967 D. O. FRANCIS 3,298,726
KNOTTER
Filed Feb. 25, 1965 6 Sheets-Sheet 5

INVENTOR.
David O. Francis
BY
Attorneys

United States Patent Office 3,298,726
Patented Jan. 17, 1967

3,298,726
KNOTTER
David O. Francis, Warwick, R.I., assignor to Leesona Corporation, Warwick, R.I., a corporation of Massachusetts
Filed Feb. 25, 1965, Ser. No. 435,273
5 Claims. (Cl. 289—2)

The present invention relates to a knot-typing mechanism for uniting the ends of two strands or filaments. More particularly, the present invention is concerned with a knot-tying mechanism for forming a fisherman's knot to unite two strands, as is especially desirous in textile operations.

Knot-tying devices of the type with which the present invention are concerned have been employed, to cite just one example, in connection with yarn handling machines. Here, a strand is wound from a supply and taken up on a core to wind a package which is the product of the machine. The knotter is customarily disposed intermediate the supply and the core and, upon occurrence of a break in the running strand of yarn, the broken ends are placed in the knotter for reuniting.

In connection with a textile winding operation such as just discussed it is diserable to reunite the broken strands in the fastest possible time to reinitiate the winding cycle as quickly as possible. Furthermore, it is of considerable advantage to be able to tie the broken ends together in a manner so that a predetermined length of tail may extend past the knot. This length is dictated for the most part by the characteristics of the standular material being wound. While the ultimate objective is to tie a knot having as short a tail as possible, this desire must be tempered by the tendency of the yarn to slip under tension. Obviously, if a strand having a rather slippery surface is knotted at its end with another having a similar type of surface the tendency of the knot would be to slip apart. However, a longer tail would afford a certain amount of slippage of the strands while maintaining the knot intact. Since winding machines usually wind a variety of materials having differing characteristics it is of immense value to the over-all operating efficiency of the winding machine to provide a knotter capable of rapid and accurate adjustment to afford a variety of lengths of tails as conditions warrant and wherein each tail of any given knot is of the same length.

With the foregoing in mind it is one object of the present invention to provide means for tying a fisherman's knot to unite two strands together so that the tails of the knot are of substantially uniform length.

Another object of the invention is to provide means for tying a fisherman's knot, wherein said means is capable of adjustment to provide tails of any desired length within broad limits.

Still a further object of the invention is to provide means for tying a fisherman's knot in strands and for controlling the movement of the strands when knotted to maintain them under tension.

A further object of the present invention is to provide a knotter which is capable of being mounted on a wide variety of textile machines for use cooperatively therewith.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Briefly, the knotter of the instant invention includes the provision of a pair of rotatable bills operable to manipulate the ends of two strands to be tied together by first forming a simple, individual loop in each strand interlaced around the standing part of the other of said strands. Thereby, each strand is tied by a rather loose loop to its companion strand, and these loops are free to slide towards each other until they meet to form an integral knot fastening the two strands together. In such knot formation it will be rather evident that the terminal or bitter ends of each of said strands will extend beyond the integral knot for some distance in the form of "tails." The present invention includes means for determining the length of these tails.

Figure 1:
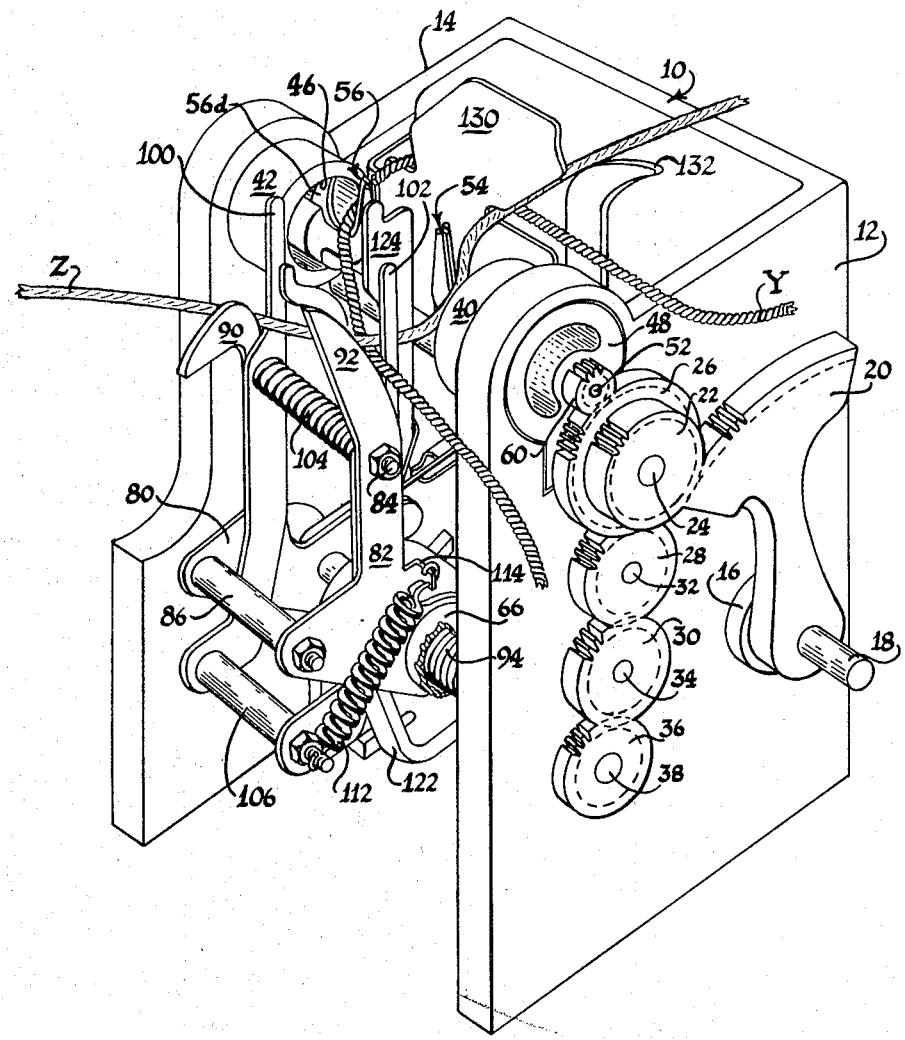
FIG. 1 is a perspective view of the knotter showing the power train arranged at the right-hand side of the unit.
Figure 2:
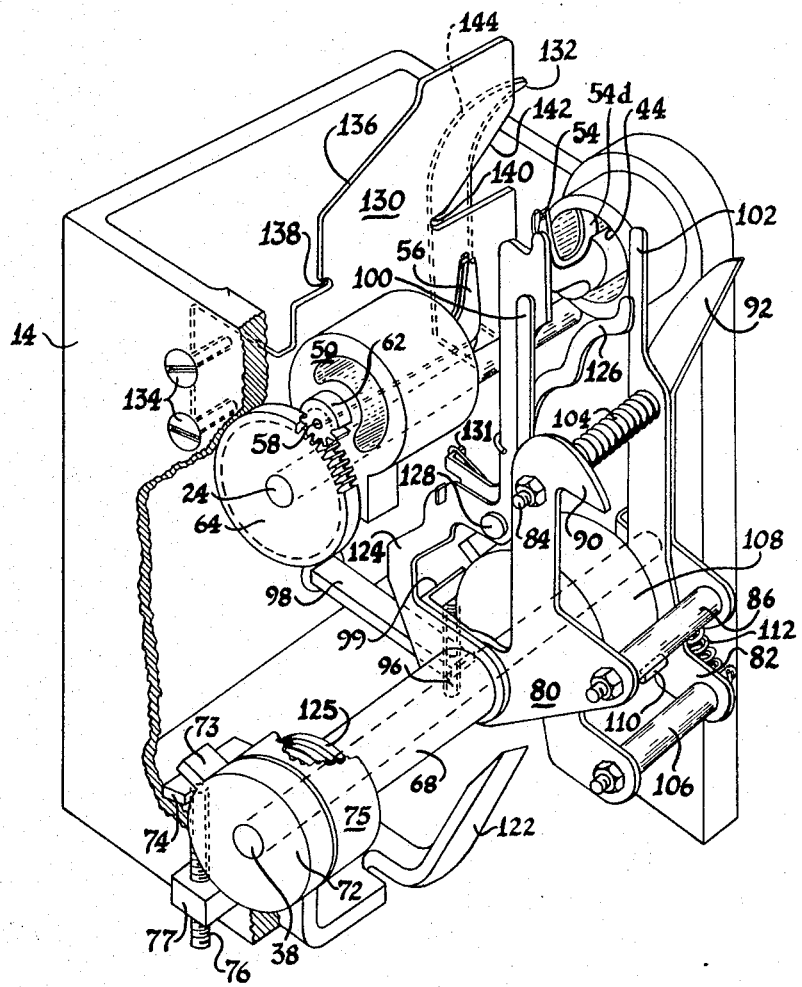
FIG. 2 is a further perspective view of the knotter from another viewing angle, the left-hand wall of the unit being broken away to reveal operational components.

Firstly, now, viewing FIGS. 1 and 2 it will be seen that a channel-like frame 10, having a right-hand wall 12 and left-hand wall 14, is provided for enclosing certain of the elements of the knotter and for affording a support for further elements thereof. The right-hand wall 12 is provided with a boss 16 which is bored through to rotatably receive a stub shaft 18. A sector gear 20 is mounted fast on the stub shaft 18 for movement therewith. The teeth of sector gear 20 engage with a pinion 22 fastened on a cross-shaft 24 journalled for rotation at its opposite ends in side walls 12, 14 of frame 10. In consequence thereof, rotation of stub shaft 18 causes sector gear 20 to rock, thereby imparting rotation to pinion 22 to drive the gear train next to be described.

A spur gear 26 is fixed tightly on cross-shaft 24 exteriorly of side wall 12 and interiorly of pinion 22. A pair of idlers 28, 30 are rotatably supported on respective stub shafts 32, 34. A further spur gear 36 is affixed on the outer end of an elongated control shaft 38 which is journalled for rotation in a suitable bearing surface in side wall 12 and protrudes through a suitable bore in wall 14. As seen in FIG. 1 idler 28 is engaged with spur gear 26 to be driven therefrom. Similarly, idler 30 engages with idler 28 and with spur gear 36. From this it will be apparent that rotation of pinion 22 will be effective to rotate the train including gears 26, 28, 30 and 36.

Viewing FIGS. 1 and 2 it will be observed that each of the side walls 12, 14 has a cylindrical member 40, 42 respectively retained into a suitable seat in the upper frontal portions of these side walls. Each of the members 40, 42 has an eccentric recess formed therein, the walls of which are configured to serve as cams 44, 46, respectively. The outermost end of each member 40, 42 has a respective wall 48, 50 formed thereat. Each said wall 48, 50 is bored through, these bores being eccentric to the axis of the members. Thus, the bore through wall 48 serves to receive the shank 52 of a rotary bill 54 for rotation therein. In like fashion a further rotary bill 56 has a shank 58 which passes through the bore in wall 50 and is rotatable therein. The outer end of shank 52 has a pinion 60 affixed thereon, this pinion engaging with spur gear 26 for rotation. Similarly, the external terminus of shank 58 mounts a further pinion 62 which engages drivingly with a spur gear 64 affixed to the left-hand end of cross-shaft 24, as shown in FIG. 2. In view of the arrangement as just described it will be appreciated that rotation of pinion 22 will act to rotate pinions 60, 62 through spur gears 26 and 64, respectively. Consequently, bills 54, 56 will be rotated in response thereto.

Turning attention now to control shaft 38 which has already been described as spanning between walls 12 and 14, this shaft has a pair of sleeves 66, 68 loosely carried thereon, see FIGS. 1 and 2, each of said sleeves being independently rotatable one from the other and each being free of driving engagement with shaft 38. Sleeve 68 protrudes through wall 14 and provides a bearing and support for control shaft 38 at the left-hand end of this shaft, as seen in FIG. 2. Further, a collar or driver 72 is securely attached to the end of control shaft 38 remote from gear 36. Driver 72 has a radial tab 73 projecting therefrom which is movable through a circular path to engage a similar tab 74 extending radially from a collar 75. In turn, collar 75 is fastened to the outer end of sleeve 68 for rotation therewith. A set screw 76 is threaded through a block 77 projecting from side 14 of frame 10 to engage tab 74. As will be explained more fully hereafter, set screw 76 serves to set the mechanisms in position to yield knots having tails of a predetermined length.

The lower end of a carrier arm 80 is loosely supported on control shaft 38. A companion carrier arm 82 is connected to sleeve 66 and a pair of parallel posts 84, 86 are employed to link the two carrier arms 80, 82 together as a rotatable, integral yoke. The upper extremities of carrier arms 80, 82 are configured as guide fingers 90, 92, respectively, and, as will become more apparent hereafter, these fingers guide the yarn to the knotter bills when a knot-tying cycle is desired. The carrier arms 80, 82 are biased to an upright or generally vertical position as shown in FIGS. 1 and 2 by a spring 94 coiled about control shaft 38 within sleeve 66 and having its opposite ends connected with carrier arm 82 and side wall 12. An adjustable stop screw 96 threaded through a pad 98 is engageable with an ear 99 extending from the lower rear side of carrier arm 80 to limit the rearward or clockwise motion (FIGS. 3–5) of carrier arms 80, 82.

As seen, for example, in FIGS. 1 and 2 a pair of clamp fingers 100, 102 are pivotally supported on post 84 and a spring 104 is coiled about said post 84 to bias clamp finger 100 in side-by-side relationship with carrier arm 80 and, similar to urge clamp finger 102 in juxtaposed relationship with carrier arm 82. Thus, the carrier arms 80, 82 and clamp fingers 100, 102 comprise a carriage which, as will be more apparent hereafter, transport the strands as a part of the knotting cycle. The lower extremities of clamp fingers 100, 102 are connected by a spacing post 106. From FIGS. 1 and 2 it will be seen that clamp fingers 100, 102 project straight upwardly a short distance above the upper ends of their related carrier arms 80, 82. Since the upper ends of the carrier arms curve forward to form guide fingers 90, 92, a V-notch is formed at the juncture where the carrier arms and clamp fingers digress from each other. These notches provide a pocket into which the strands to be knotted together can be received and held as a step in the over-all knotting procedure.

Figures 3, 4:
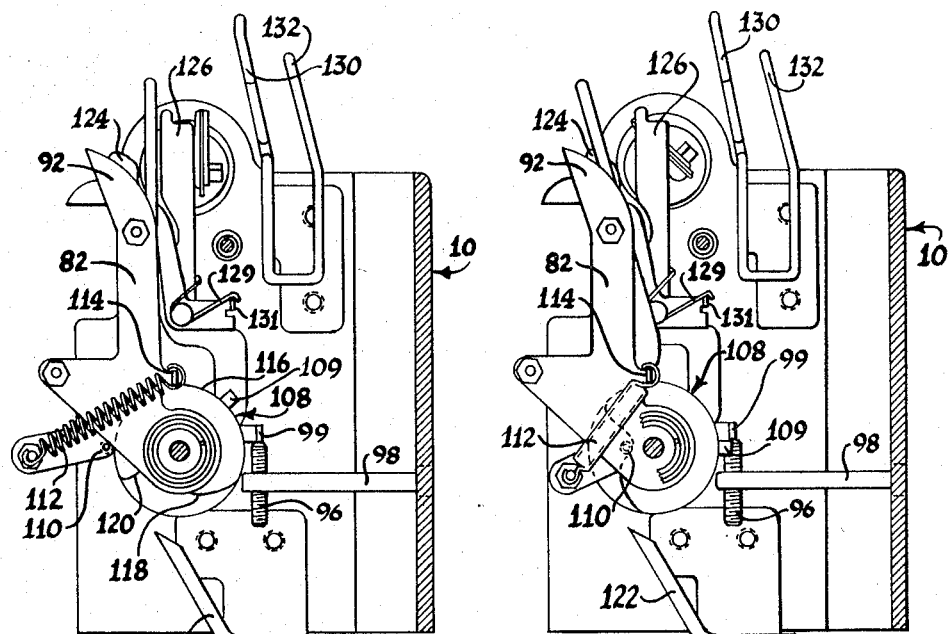
FIG. 3 is a right side elevational view of the knotter of FIGS. 1 and 2 with the right side of the frame removed to show the interior thereof.
FIGS. 4 and 5 are views similar to FIG. 3 illustrating the parts in different operating positions.
Figure 5:
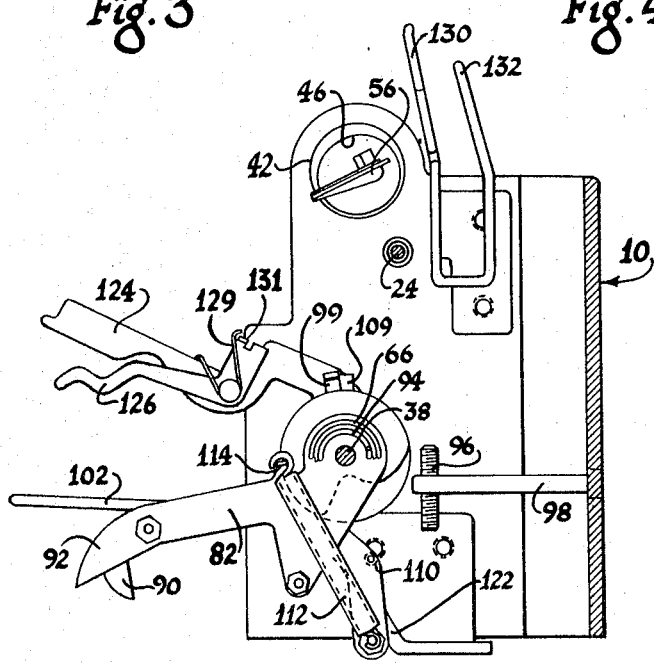

The clamp fingers 100, 102 are operable under the influence of a cam 108 secured to control shaft 38 for movement therewith and having a tab 109 projecting radially therefrom. A pin or cam follower 110 is embedded in the side of clamp finger 102 and extends laterally to engage with cam 108. A spring 112 is connected at one of its ends to post 106 and is attached at its opposing end to a projection 114 folded out from carrier arm 82 to bias follower 110 against the periphery of cam 108. As best shown in FIGS. 3, 4 and 5, cam 108 provides a surface concentric with its axis over approximately one-half of its circumference as referenced at 116, this surface then blending in with an eccentric or downwardly inclined surface at 118 which terminates in a shoulder or wall 120. Hence, as cam 108 is rotated in a counterclockwise direction (FIG. 3) follower 110 rides along the concentric surface 116 during which time clamp fingers 100, 102 are held stationary. As the follower 110 rides down surface 118 the clamp fingers rock counterclockwise (FIG. 3) to clamp a strand positioned therein as shown in FIG. 1 between the clamp fingers and carrier arms 80, 82. The yarn is held in this clamped position as cam 108 is rotated further in the counterclockwise direction. As a consequence of the continuing rotation of cam 108, tab 109 abuts against ear 99 causing the carrier arms 80, 82 and companion clamp fingers 100, 102 to swing forwardly, i.e., in a continuing counterclockwise direction, as seen in FIGS. 3, 4 and 5. The strands are released from the clamped position as these arms 80, 82 and their companion clamp fingers 100, 102 swing downward to the point where post 106 engages a camming projection 122 which causes the clamping fingers 100, 102 to rock rearwardly, i.e., clockwise as viewed in FIGS. 3–5 and open against the biasing force of spring 112.

Collar 75 has already been described as connected to sleeve 68 and has been said to have an integral tab 74 which projects to be engaged by tab 73 of driver 72 as this latter element is rotated pursuant to rotary motion of control shaft 38. The interior end, that is to say, the end of sleeve 68 remote from collar 75 has a center post 124 secured thereto. A spring 125 is coiled about control shaft 38 and biases center post 124 counterclockwise (FIG. 2). Thus, as control shaft 38 is driven, tab 73 of driver 72 eventually engages tab 74 whereupon sleeve 68 is rotated to rock center post 124 forwardly. As will be further explained hereafter, such motion is carried out after the strands have been looped together and preparatory to discharging the knotted strands from the unit. A tensioning bail 126 is rockably connected to the mid-section of center post 124 by a stud 128 and serves cooperatively with the center post in transferring the strands from the knotter to the normal winding path. A spring 129 biases bail 126 rearward or counterclockwise (FIG. 2), the bail having an appendage 131 for contacting center post 124 to limit its rearward movement.

Earlier in the discussion it was recited that a pair of rotary bills 54, 56 are driven by pinions 60, 62 respectively. Bills 54, 56 each include a generally cylindrical, bifurcated hook 54a and 56a, respectively. A respective clamp-shear member 54b, 56b is pivotally positioned on an associated pin 54c, 56c within the bifurcation of the related hook 54a, 56a. One side of each clamp-shear member 54b, 56b is sharpened to effectively cut yarn clamped between said member and its associated hook. The other end of said member is configured to provide a clamp cooperative with its hook to retain the end of yarn therein. The distal end of each clamp-shear member 54b, 56b is formed as an enlarged portion or cam follower 54d, 56d, respectively. Each follower resides within a related recess of members 40, 42, respectively, communicating with an associated internal cam 44, 46. Thus, as bills 54, 56 are rotated the clamp-shear members 54b, 56b operate to receive, clamp, and sever strands presented between these members and hooks 54a, 56a.

So the end of the strands which are to be knotted together may be properly positioned within the knotter there are two guide plates 130, 132 provided. Guide plate 130 is fastened to side wall 14 by screws 134 and protrudes into the zone behind rotary bills 54, 56. The inclined surface 136 affords a guiding edge down which a strand may be drawn, the strand eventually becoming seated in a recess 138. As best illustrated in FIG. 2, recess 138 is generally in the horizontal plane of bills 54, 56, the strand Y being guided through recess 138 around the bight of bill 56, in front of center post 124 and through the V-notch defined by guide finger 92 and clamp finger 102, preparatory to being knotted. Guide plate 130 also has a further recess 140 at the side of the plate remote from recess 138. The edge of the plate adjacent thereto is conformed as a further guiding surface 142 to urge the strand into said recess 140. Again, with reference to FIG. 2, it will be seen that a further strand Z to be knotted is laid in recess 140, passed around the bight of bill 54 in front of center post 124 and through the V-notch defined by guide finger 90 and clamp finger 100. The additional guide plate 132 is a folded upward extension of guide plate 130. Said plate 132 is located rearwardly of plate 130 and has a surface 144 aligned vertically with surface 142 to control the movement of a strand into recess 140.

Considering next the operation of the knotter of the instant invention, it has already been discussed that the knotter may be adjusted to tie two strands together and produce tails extending from the knot of any desired length within the structural limits of the device. Hence, at the outset of operation the knotter may be adjusted to a position commensurate with the tail length desired. While it is to be understood that an infinite variety of tail lengths are possible with the present invention it will serve to describe the operation of the knotter in connection with just two situations, i.e., knotting so as to produce relatively short tails in the resulting knot, and knotting so as to provide relatively long tails in the knot which is formed. The procedures for providing tail lengths in between these extremes will be readily evident from the ensuing discussion.

Considering firstly the arrangement of the knotter for producing fisherman's knots having relatively short tails, set screw 76 is rotated downwardly permitting tab 74, collar 75 and, hence, sleeve 68 to move counterclockwise (FIG. 2). In consequence thereof center post 124, connected to sleeve 68, is situated somewhat rearwardly of the bills 54, 56, as illustrated in FIG. 6.

Figure 6A:
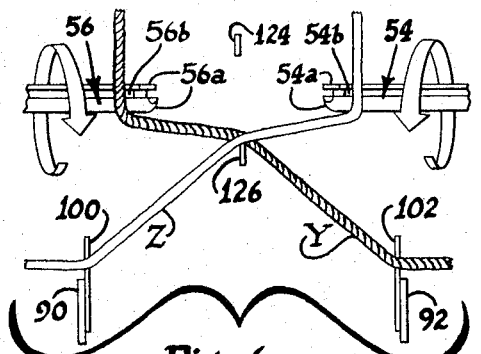
FIGS. 6a–6g are schematic views illustrating different stages of the knotting operation for tying knots having short tails in accordance with the present invention.

Strand ends Y and Z are then threaded in the knotter as illustrated in FIGS. 1 and 6a. That is to say, and Y is drawn through the V-notch at the juncture of guide finger 92 and clamp finger 102, crossing in front of center post 124, passing across the bight or hooked portion of rotary bill 56 and through recess 138. In like fashion, strand end Z is carried through the V-notch of guide finger 90 and clamp finger 100, crossing in front of center post 124 (in a position to lay on top of end Y), passing around the bight of bill 54 and through recess 140. At this time the ends are in readiness for knotting together. The threading of the knotter may be achieved by any convenient means, for example, mechanical and/or suction means such as are well known in practice with automatic textile winding machines. It will be appreciated that the inner or opposite ends of the standing parts of strands Y and Z would extend, for example, to a supply package and a winding package of an associated winding machine.

Figure 6B:
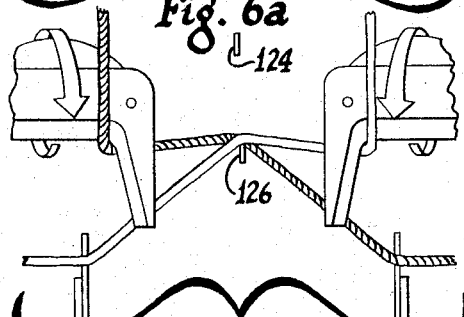
Figure 6C:
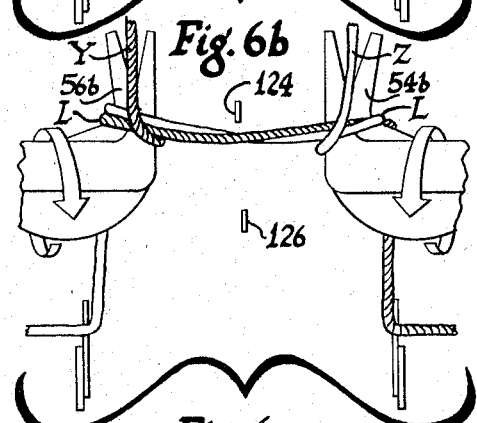
Figure 6D:
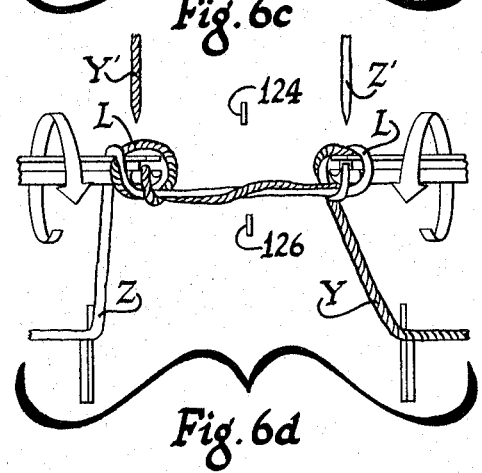
Figure 8:
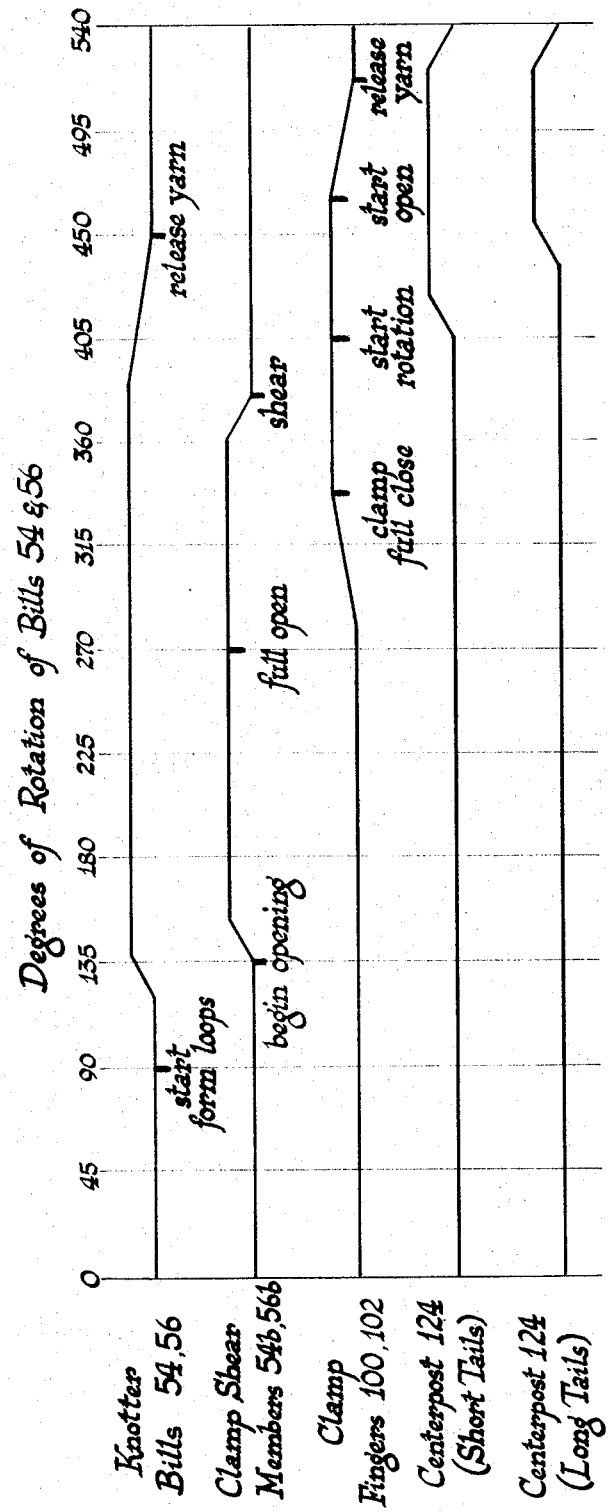
FIG. 8 is a timing diagram relating to knotter performance.

To operate the knot-tying mechanisms stub shaft 18 is rotated by appropriate means which may be a crank unit of a related textile machine (not illustrated), this motion acting to rock sector gear 20 through its stroke to drive pinion 22 and to rotate cross-shaft 24. In consequence thereof the instrumentalities are operated as follows, and as diagrammatically depicted in FIG. 8 to tie strands Y and Z together. Bills 54, 56 in approximately the first 90 to 100 degrees of rotation in the forward or counterclockwise direction (see the arrows in FIG. 6a) engage the portions of strands Y and Z, respectively, spanning between the clamp fingers and bills as shown in FIG. 6b whereupon each span of each strand slides downward into the bight of its associated bill. Continued rotation of bills 54, 56 causes the clamp-shear members 54b, 56b to be cammed open as their respective followers ride against suitable lobes of cams 44, 46. The clamp-shear members 54b, 56b begin to open after about 135° of rotation of the bills and said clamp-shear members are fully open to receive the strands therein after generally 270° of rotation, as illustrated in FIG. 6c. From this same view it will be noted that strand Y is looped around the bight of bill 56 and that the waste end of strand Y held in, say, an aspirator (not shown) is about to be clamped and severed by clamp-shear member 56b. Similarly, strand Z is looped about the bight of bill 54 with the waste end of strand Z about to be clamped and cut by clamp-shear member 54b. After about 285° of revolution of the bills, cam 108 which is rotating with control shaft 38, moves its surface 118 under follower 110 permitting clamp fingers 100, 102 to rock clockwise (FIG. 4) under the force of spring 112 to thereby clamp the yarn between the clamp fingers and guide fingers 90, 92. This clamping action is completed after about 330° of revolution of the bills.

When bills 54, 56 have revolved about 385°, their respective clamp-shear members are closed by the action of followers 54d, 56d riding up on suitable dwells of cams 44, 46, respectively. As earlier explained, this action cuts the waste ends Y′ and Z′ of strand Y and Z, respectively and, further, clamps the newly created ends of each of these strands in the associated bills 54, 56, see FIG. 6d.

Figure 6E:
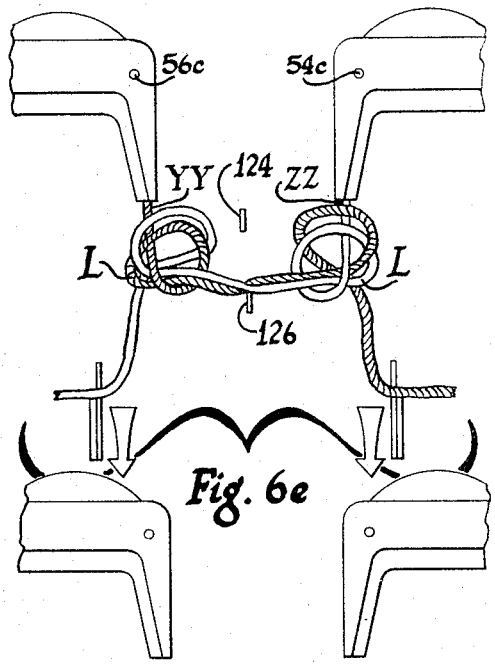
Figure 6F:
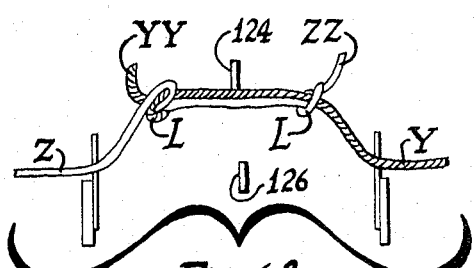
Figure 6G:
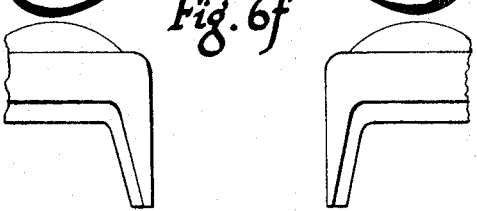

Promptly after the waste strand ends Y′, Z′ are severed (after about 405°) as just described, the carriage including carrier arms 80, 82 and clamp fingers 100, 102 begin to swing forwardly, i.e., in the direction of the arrows in FIG. 6e. This motion occurs as tab 109 abuts against ear 99 of carrier arm 80, see FIG. 4, and is rotated further by rotation of cam 108 with control shaft 38. As illustrated in FIG. 6e this motion causes the individual loops L formed over the standing part of the opposite strand to be pulled off bills 54, 56 while the terminal ends or tails YY, ZZ of each strand Y, Z, respectively, is held by an associated bill. The carriage constituted of the carrier arms 80, 82 and clamp fingers 100, 102 continues to rock forwardly to the position as illustrated in FIG. 5 whereby post 106 engages with projection 122 to open the clamp fingers and release the tied strands for delivery under fingers 100, 102 to the normal winding path as seen in FIG. 6g. This action occurs after generally 540° of revolution of the bills.

In order that the individual loops L of strands Y and Z which have been formed in each strand and entwined about the opposite strand may be retained in a form having relatively short tails, it is necessary that the major portion of the spans of strands Y and Z extending between bills 54, 56 not be drawn out into tails but, rather that these spans flow out to extend the standing parts of the strands. This is achieved initially by positioning center post 124 as shown in FIG. 6a so that the spans of yarn ultimately extending between bills 54, 56 are in essentially a straight line therebetween. Thereafter, as the loops L are drawn off bills 54, 56, by clamp fingers 100, 102 bail 126 initially applies tension to the spans of strand between the loops L restricting the tendency of the loops to slide together. Further rocking of clamp fingers 100, 102 causes center post 124 to engage the spans of the strands between loops L (see FIG. 6e) and, therefore, continue to restrict the movement of the loops toward each other. Hence, the tension applied to the loops as the strands Y and Z are pulled between their associated bills and clamp fingers causes the loops L to tighten down on the standing parts of the strands as illustrated in FIGS. 6e and 6f, thus keeping the loops L apart. After the strands Y, Z are released from bills 54, 56 and clamp fingers 100, 102, the united strands with the loops still separated slide onto and over bail 126 which maintains tension on the strands. As the strands recommence winding along their normal path, the tension in the strands imparted as winding proceeds is effective to slide the loops L together to form composite knot K. However, it is to be noted that tails YY, ZZ do not elongate due to the fact that they are tightly knotted onto the standing parts of their companion strands. Rather the tails are maintained at their predetermined lengths existing when released from bills 54, 56. The excess yarn yielded as the tails slide together to form the knot K slide out into the standing part of the strands. Moreover, as seen in FIG. 6g, the tails are of substantially uniform length. At the end of the knotting cycle these parts are returned to their "loaded" position preparatory to be threaded for tying another knot as sector gear 20 is rocked clockwise (FIG. 1) by its operating means.

Figure 7A:
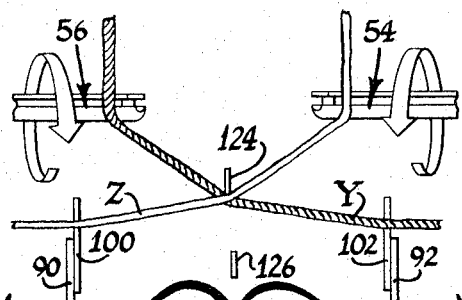
FIGS. 7a–7f are schematic views similar to FIGS. 6a–6g illustrating different stages of the knotting operation for tying knots having relatively long tails.
Figure 7B:
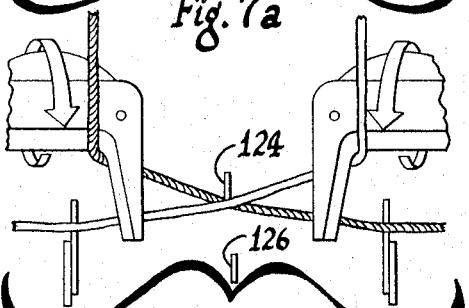
Figure 7C:
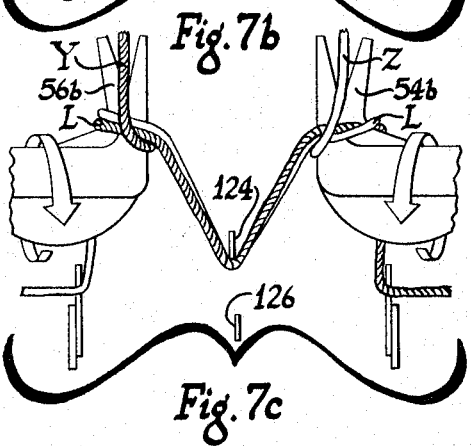
Figure 7D:
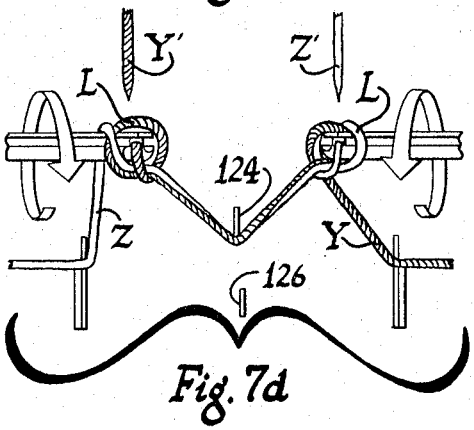
Figure 7E:
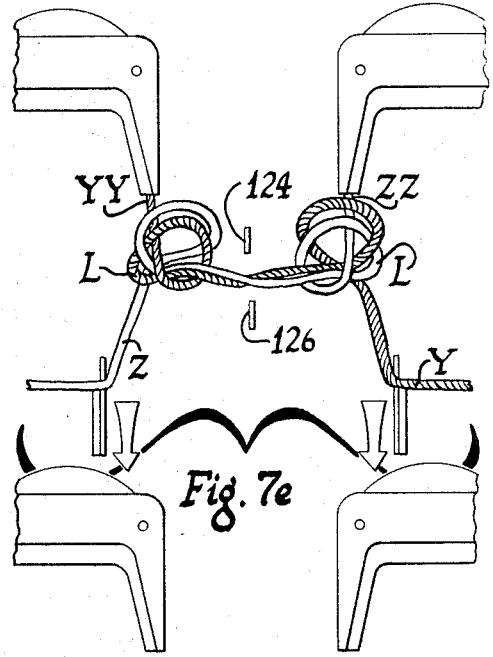
Figure 7F:
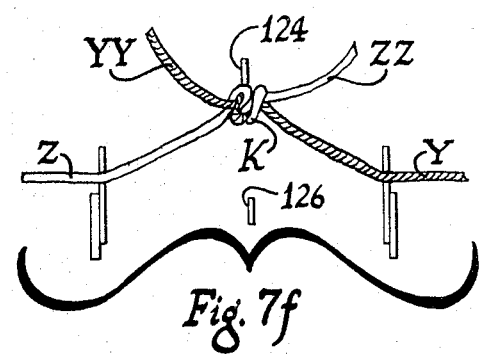

Now to consider the arrangement and operation of the present invention to provide a fisherman's knot having significantly longer tails than just described, set screw 76 is rotated to force tab 74 upwardly or clockwise as viewed in FIG. 2 whereby to rock center post 124 to a starting position forwardly of bills 54, 56, as shown in FIG. 7a. The knotter is then threaded as previously described. As will be observed in FIGS. 7a and 7b when the knotter is threaded to form a knot having long tails the strands are in contact with center post 124 as they lay in their threaded positions in the knotter. Indeed, center post 124 causes the strands to follow a somewhat tortuous path thereby elongating the spans of yarn extending between clamp fingers 100, 102 and bills 54, 56. Again, as earlier described, the knotting components are activated by rotation of pinion 22 to thereby drive bills 54, 56 through about 540° of revolution. The bills 54, 56 rotate counterclockwise as viewed in FIG. 1, i.e., in the direction of the arrows in FIG. 7a, serving to pick up strands Y and Z in the bights of the bills 54, 56, respectively, in the first 90–100° of rotation thereby looping the strands about the bills, as seen in FIGS. 7b and 7c. It will be noted in FIG. 7c that due to the forward disposition of center post 124 the stretches of the strands between bills 54, 56 are increased over that existing when the short tails were formed; (contrast the lengths of yarn between the bills in FIGS. 6c and 7c). Thus, as bills 54, 56 continue to pivot the strands are looped about the standing parts of each other and the waste strand ends are severed, all as described earlier for short tails. However, as illustrated in FIG. 7d, the portions or the strands between the bills 54, 56 continue to be engaged by center post 124 as the strands are severed by clamp-shear members 54b, 56b. It will be appreciated that clamp fingers 100, 102 are operated in the same sequence as set forth in the procedure for short tails to hold the strands during severing. After the waste ends Y', Z' have been cut the carriage constituted as carrier arms 80, 82 and clamp fingers 100, 102 commence to rock forward, this action, as earlier stated, resulting from rotation of cam 108 after the bills 54, 56 have rotated about 405°. In contrast to the motion of center post 124 when short tails are formed, it will be observed from the graphic illustration of FIG. 8 that the center post 124 does not move forward until the bills 54, 56 have rotated about 460°. Therefore, as the carrier arms 80, 82 and clamp fingers 100, 102 swing forwardly they move away from center post 124 releasing tension on the strand portions between bills 54, 56 allowing tails YY, ZZ, held by the bills, to be drawn through the loose loops L. Before engaging bail 126, center post 124 moves forward lagging behind loops L which are being drawn tight taking yarn from relatively long section between the bills. Center post 124 finally comes to bear on the center section just as the knots are drawn together to assist in tightening the knot K and removing tails from bills. The united strands then fall onto bail 126 which prevent slack from developing in the united strands. As with the procedure involved with tying short tails, the knotter is reloaded by clockwise rocking motion of sector gear 20, see FIG. 1.

From the foregoing it will be appreciated that the length of tails YY, ZZ which is produced will be determined in part by the expanse of strands Y, Z running between bills 54, 56 at the outset of the knot-tying cycle and will, in part, be determined by the amount of tension on strand portions extending between loops L as they are drawn together. This tension acts as a restricting force preventing the loops L from sliding together and is induced by the action of center post 124 and bail 126 as just described. In general, for knots having short tails the center post 124 and bail 126 engage the spans between loops L rather promptly after the loops have been withdrawn from bills 54, 56. In contrast, the center post and bail provide virtually no restrictive force when a knot having long tails is desired, the center post in this latter instance only acting at the moment when the loops close together to form a composite knot. As already pointed out, with the ends of the strands clamped in bills 54, 56 the ends of the loops are free to run out past each loop to elongate the tail until the loop is tightened. Then such running out of the strand to provide further tail elongation is prevented and any remaining excess of yarn slides out of the loops to the standing parts of the strands. From the previous discussion it will be apparent that both of the conditions are controllable through set screw 76 acting to position center post 124 relative to bills 54, 56 and serving to establish the radial location of tab 74. Since the radial tab 73 swings in a clockwise direction as viewed in FIG. 2 it will be evident that the more elevated tab 74 is positioned at the outset, i.e., the closer it moves to a vertical plane, the longer it will take tab 73 to engage it to rock center post 124 and bail 126. Hence, the longer tails YY, ZZ will become before such elongation is arrested by pressure from the center post and bail. Obviously, the length of the tails extending from the knot may accordingly be adjusted within the limits of the knotter unit by simply adjusting set screw 76.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Mechanism for uniting first and second strands comprising, rotary bills arranged to form a loop in each of said first and second strands entwined about the other of said strands, a carriage positioned adjacent said bills and arranged to engage said strands to disposed a predetermined span of each strand in a zone between said carriage and said bills, means for operating said carriage to withdraw said loops from said bills, said carriage serving cooperatively with said bills to provide a tail in each strand between said loop and the outer strand ends, means operative to release said strands from said carriage after withdrawal of the loops from said bills, and guide means for engaging and controlling said strands after release thereof from said carriage.

2. Mechanism for uniting first and second strands comprising, a pair of rotary bills operable to yieldably hold the outer ends of said first and second strands, means for driving said bills to form a loop in each strand entwined about the other of said strands, said loops being spaced apart to provide a span of each strand of predetermined length therebetween, a pivoted carriage for withdrawing the loops from said bills while maintaining said outer ends in said bills, said pivoted carriage being operable to extend a portion of the strand from each loop to form an elongated tail between each said loop and the outer end of each strand, a tension assembly operable on said strand spans to restrict the elongation of each said tail to a predetermined length, and means for operating said tension assembly during formation of said tails.

3. Mechanism for uniting first and second strands comprising, a pair of rotary bills operable to yieldably hold the outer ends of said first and second strands, means for driving said bills to form a loop in each strand entwined about the other of said strands, said loops being spaced apart to provide strand spans of predetermined length therebetween, a pivoted carriage for withdrawing the loops from said bills while maintaining the outer ends in said bills, said pivoted carriage being operable to extend a portion of the strand of each loop to form an elongated tail between each said loop and its outer strand end, a tension assembly for limiting the length of said tails, means for operating said tension assembly during formation of said tails, and an adjustable member for controlling the operation of said tension assembly against said strand spans to provide tails extending from said loops of predetermined lengths.

4. Mechanism for uniting two strands comprising, first and second rotary bills for engaging an individual one of said strands, a movable carriage position adjacent said bills, said carriage having holding means for each strand acting to direct said strands held therein to said bills to provide a span of each strand across the zone intermediate said carriage and said bills, a tension assembly disposed in said zone and engageable with said strand spans, positioning means for adjusting the location of said tension assembly to vary the length of said spans, means for driving said bills to form a loop in each strand entwined about the other of said strands, actuating means for actuating said carriage to withdraw said loops from said bills, said carriage when actuated being operable to extend a portion of the strand from each loop to provide an elongated tail between each said loop and the outer end of each strand, said loops tending to slide together to form a composite knot in response to movement of said carriage, and driver means for rocking said tension assembly to engage said strands in their respective spans to restrict the elongation of said tails to predetermined lengths.

5. Mechanism for uniting two strands comprising, first and second rotary bills, first and second holding means rockably positioned adjacent said bills, said first and second holding means acting to receive an individual one of said strands and direct it to an associated one of said bills, a span of yarn being provided in each strand in a zone between its respective holding means and bill, a tension assembly disposed in said zone, positioning means for adjusting the location of said tension assembly to vary the length of said spans, means for driving said bills to form a loop in each strand entwined about the other of said strands, clamp-shear means associated with said bill for severing the outer end of said strands to provide a fresh end for each strand clamped in its related bill, cam means for actuating said first and second holding means to secure said strands therein as said loops are formed, actuating means for rocking each said holding means to withdraw the loops from said bills, each said holding means when rocked being operable to extend a portion of the respective strand held thereby to provide an elongated tail between the associated loop and the strand end held in the respective bill, said loops tending to slide together to form a composite knot in response to rocking of said holding means, driver means for actuating said tension assembly to engage said strands in their respective spans to restrict the elongation of said tails to predetermined lengths, means for releasing said fresh strand ends from said bills after said tails have been formed, and a cam for operating said first and second holding means to release said strands whereby said loops are free to slide together to form a composite knot while the tails are maintained at predetermined lengths.

References Cited by the Examiner
UNITED STATES PATENTS

| | | | |
|---|---|---|---|
| 2,264,784 | 12/1941 | Abbott | 289—2 |
| 3,110,511 | 11/1963 | Gebold et al. | 289—12 |
| 3,166,346 | 1/1965 | Gotz | 289—2 |

MERVIN STEIN, *Primary Examiner.*

L. K. RIMRODT, *Assistant Examiner.*